United States Patent [19]

Sampson

[11] 4,262,692
[45] Apr. 21, 1981

[54] BELL TRAP AND CHECK VALVE COMBINATION

[76] Inventor: Mark A. Sampson, 509 N. Washington St., Titusville, Pa. 16354

[21] Appl. No.: 94,983

[22] Filed: Nov. 16, 1979

[51] Int. Cl.³ ............................................. F16K 31/22
[52] U.S. Cl. .................. 137/433; 137/454.2; 137/519
[58] Field of Search ............ 137/202, 430, 433, 454.2, 137/519

[56] References Cited

U.S. PATENT DOCUMENTS

| 783,493 | 2/1905 | Wood | 137/433 |
|---|---|---|---|
| 1,423,679 | 7/1922 | Pavitchich | 137/433 |
| 1,996,398 | 4/1935 | Barzyk | 137/433 |
| 2,049,909 | 8/1936 | Kirschner | 137/433 |
| 2,787,376 | 4/1957 | Coulson | 137/433 |
| 2,843,146 | 7/1958 | Kirschner | 137/433 |
| 3,084,706 | 4/1963 | Lunde | 137/202 |
| 4,088,149 | 5/1978 | Logsdon | 137/433 |

Primary Examiner—Martin P. Schwadron
Assistant Examiner—G. L. Walton
Attorney, Agent, or Firm—Charles L. Lovercheck

[57] ABSTRACT

A bell trap and check valve is disclosed. The bell trap has a central tubular member around its outlet and a conventional cover. The check valve is removably attached to the central tubular member and supported thereon.

9 Claims, 5 Drawing Figures

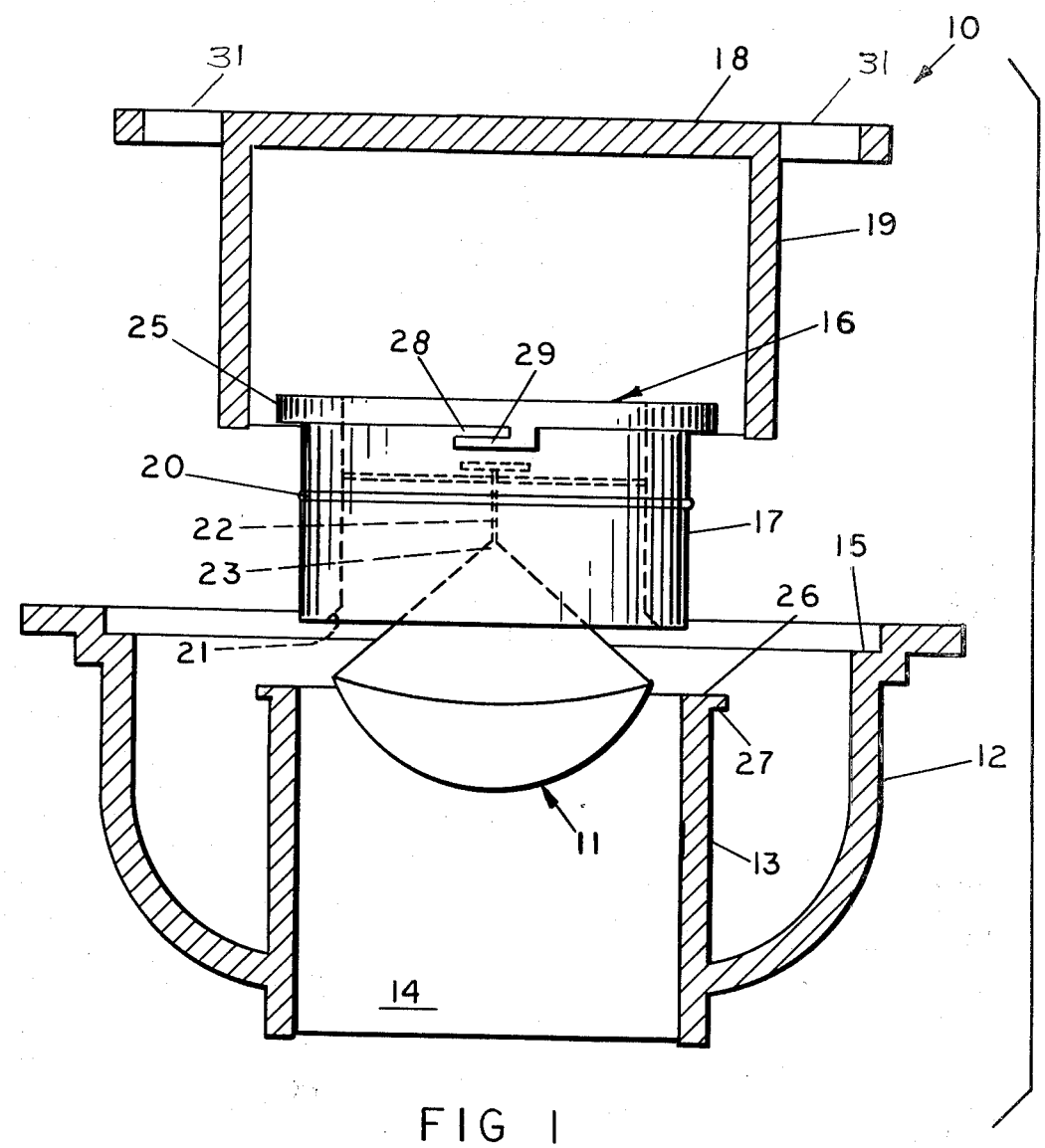
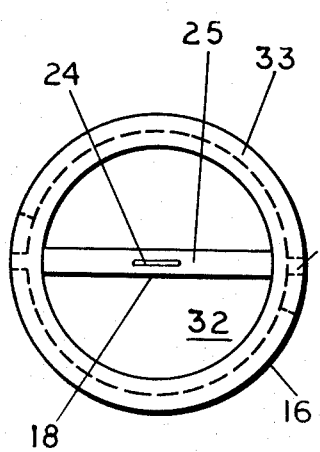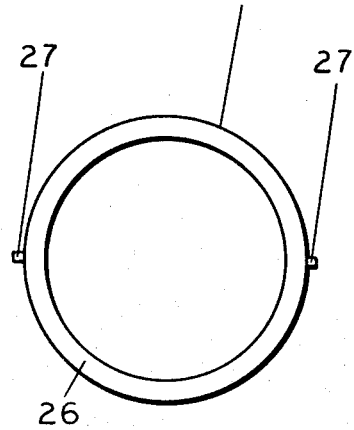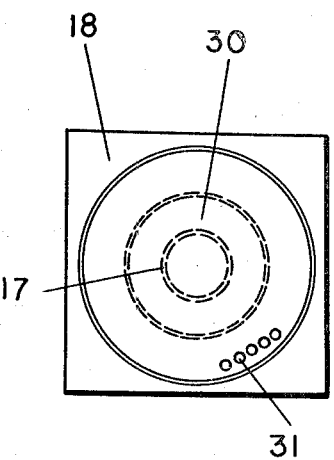
FIG 1
FIG 2   FIG 3   FIG 4

BELL TRAP AND CHECK VALVE COMBINATION

Traps are installed in floors to prevent the passing of sewer gases. Some have an added feature which is preventing the back flow of waste on to floors. Some allow the servicing of these check valve devices without removing the entire mechanism from the floor providing that they are not corroded together.

Some allow the passing of a drain cleaning machine provided that they are not corroded together. The back water bell trap herein described has all of the features of the above and several advantageous features in addition.

OBJECTS OF THE INVENTION

It is an object of the invention to provide a combination check valve and bell trap that is simple in construction, economical to manufacture and simple and efficient to use.

Another object of the invention is to provide a bell trap into which at a later date a check valve assembly can be merely inserted.

Another object of the invention is to provide a bell trap and check valve combination wherein the check valve can be serviced without removing the trap from the floor.

Another object of the invention is to provide a bell trap and check valve combination wherein the drain can be thoroughly cleaned without removing the trap from the floor. A three inch cutter tool could pass through a standard nine inch bell trap.

Another object of the invention is to provide a bell trap and check valve combination wherein the bell trap is designed with a deep seal feature to help eliminate evaporation problems. Another object of the invention is to provide a bell trap and check valve combination wherein the check valve assembly would have a high pressure seal, but could be removed years later with a sixteenth turn using no tools. Also the check valve assembly would not become immovable due to time and water because it would be unthreaded and constructed of plastic.

Another object of the invention is to provide a bell trap and check valve combination wherein the check valve assembly can be removed to accommodate a large volume of water when hosing floors or flushing sewers.

Another object of the invention is to provide a drain and check valve assembly wherein the structure is self-scouring in that there are no dirt pockets in the drain for sediment to build up in.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a longitudinal cross-sectional exploded view of the bell trap-check valve and lid according to the invention.

FIG. 2 is a top view of the check valve support according to the invention.

FIG. 3 is a top view of center part of the bell trap taken on Line 3—3 of FIG. 1.

FIG. 4 is a top view of the lid for the bell trap.

DETAILED DESCRIPTION OF THE DRAWINGS

Figure 5:
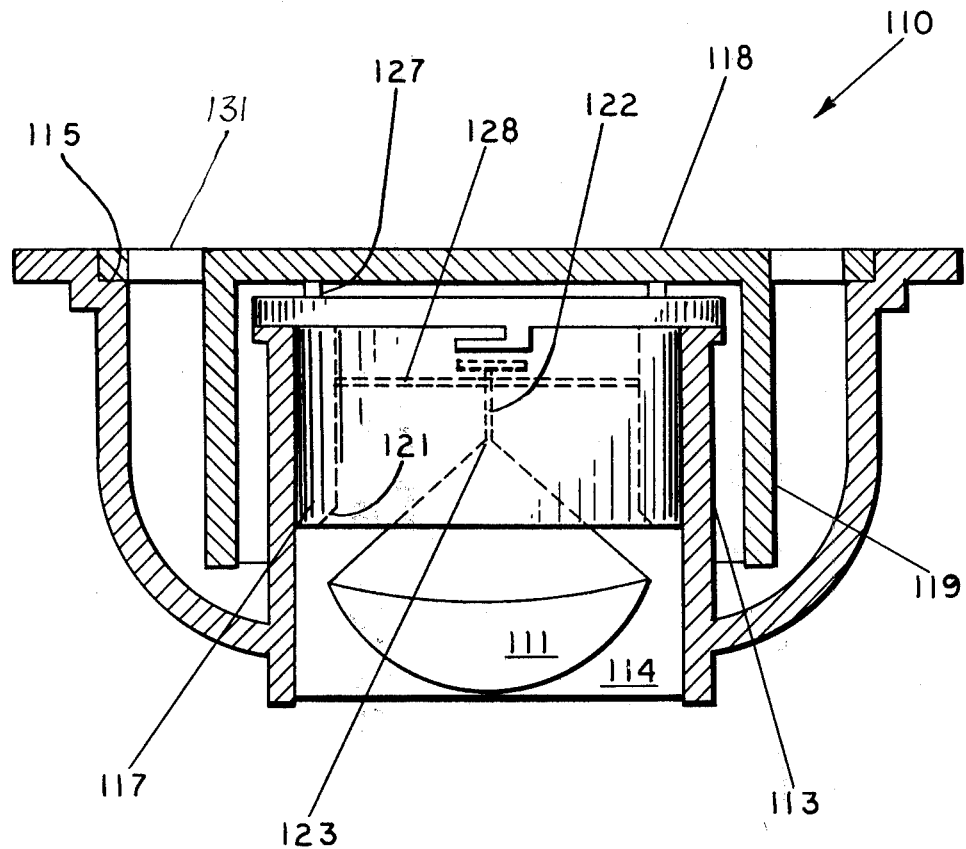
FIG. 5 is a second embodiment of the invention as shown in FIG. 1.

Now, with more particular reference to the drawings. I show a combination bell trap and check valve 10. The bell trap has a hollow cup-like body 12 with an outlet opening 14 and a tubular member 13 in the body extending upwardly and surrounding the outlet opening 14. A cover support means 15 is provided on the upper edge of the body for supporting the cover and a check valve assembly 16 is supported in the tubular member. The check assembly valve includes a tubular guide member 17 fixed which fits down into the tubular member 13 and has an outside peripheral groove in which the "O" ring 20 is received in it. The "O" ring 20 makes sealing engagement between the inside of the tubular member 13 and the guide member 17.

The check valve 11 in the shape of an inverted cone with a hemispherical bottom part 40 and the conical surface of the check valve make sealing engagement with the ground seat surface 21. The check valve 11 is supported by means of the guide rod 22 which is fixed to the apex of the check valve 11 at 23 and is slidably received in an opening 24 in the guide bar 25. The guide member 17 has an outwardly directed flange 25 which rests on the upper edge 26 of the tubular member 13 and the tubular member 13 has outwardly extending lugs 27 which are received in the notch 28 above the ears 29 on the check valve support.

The lid 18 has an unperforated central part 30 and several rows of holes 31 adjacent the outer periphery through which water can enter. This water enters down around the downwardly extending cylindrical member 19.

In the embodiment of the invention shown in FIG. 5, I show a bell trap and back flow valve combination 110 made up of the bell trap having a cup-like body 112 with a hollow tubular member 113 fixed to the bottom and extending upwardly around the outlet opening 114 in the bottom of the bell trap. The bell trap has a rim around its top with a seat 115 which supports the outer peripheral edge of the cover 118. The cover 118 has openings 131 therethrough to allow water to enter said cup-like bell trap.

A hollow cylindrical member 119 is fixed to the cover 118 and extends downward therefrom and provides a space between the hollow cylindrical member 119 and the tubular member 113. The second hollow cylindrical member 117 is fixed to the cover 118 by means of the spaced leg 127 which provide a space for water to flow through the opening 131 into the bell trap and up between the tubular member 113 and the hollow cylindrical member 119 over the top of tubular member 113, between it and the cover through the space between the legs 127 and down into the center of the trap through the opening 114.

The float valve 111 is supported by the wire 122 on the cross member 128 and it can float up to bring its outer surface into engagement with the seat 121. The wire 122 is attached to the float valve 111 and 123.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which as exclusive property or privilege is claimed are defined as follows:

1. In combination, a bell trap and a float type check valve, the bell trap has a hollow cuplike body (12) with an open top and an open outlet opening (14),
the check valve (11) is supported in said body,
a tubular member (13) in said cuplike body surrounding said outlet opening,
a cover support means (15) on the upper edge of said body for supporting said cover,
a check valve support,
said check valve support having a tubular guide member (17) fixed thereto and adapted to be telescopically received in said tubular member (13),
and bar means (28) on said guide member (25) for supporting said check valve,
said trap has a lid (18) and a downwardly extending cylindrical member (19) on said lid adapted to received between said body (129 and said tubular member (13) providing a space therebetween and providing a space between said cylindrical member and said tubular member to enable water to flow through openings in said cover into said spaces and over said tubular member and through said check valve,
a valve seat (21) on said guide member (17),
said valve (11) being adapted to flow up into engagement with said seat (21) to close off the backflow of water through said outlet opening (14).

2. The combination recited in claim 1 wherein sealing means is provided between said cylindrical member and said tubular member engaging and forming a seal therebetween.

3. The combination recited in claim 2 wherein said sealing means comprises a groove in said guide formed in said cylindrical member and an "O" ring in said groove.

4. The combination recited in claim 3 wherein said outlet surface of said guide member is generally cylindrical.

5. The combination recited in claim 3 wherein said check valve is in the form of an inverted cone made of resilient material and the apex of said cone is attached to said guide means.

6. The combination recited in claim 5 wherein said apex of said cone is attached to said guide member by means of a rod slidably attached to said check valve (25).

7. In combination, a back flow valve and bell trap comprising,
a bell trap,
said bell trap having a cup-like body terminating at its upper edge in a rim with a bottom having an outlet opening,
a first tubular member attached to said bottom and extending upwardly from said bottom,
a cover resting on said rim,
a second hollow tubular member spaced downwardly from said cover and is snuggly received in said first tubular member, a valve seat on the lower end of said said hollow tubular member,
a first hollow cylindrical member fixed to said cover and extending therefrom generally concentric to and outside said first tubular member providing a space between said bell trap and said cylindrical member and providing a space between said first tubular member and between said first cylindrical member for water to flow through openings in said cover into said cup-like body, upward between said first tubular member and said cylindrical member and between said hollow tubular member and said cover to the inside of said second cylindrical member,
a float valve supported relative to said second tubular member and adapted to float up into engagement with said valve seat for stopping back flow through said bell trap opening and through said cover.

8. The combination recited in claim 7 wherein said second tubular member has an outwardly directed peripheral flange resting on said first tubular member.

9. The combination recited in claim 7 wherein said hollow tubular member is fixed to said cover by means of spaced legs fixed to said cover and extending downwardly therefrom and providing a space between said hollow tubular member and said cover for water to flow into said check valve.

* * * * *